United States Patent [19]
Masuda

[11] Patent Number: 5,564,644
[45] Date of Patent: Oct. 15, 1996

[54] LIGHT SHIELDING MAGAZINE FOR A FILM CARTRIDGE

[75] Inventor: Sigeru Masuda, Wakayama, Japan

[73] Assignee: Noritsu Koki Co., Ltd., Japan

[21] Appl. No.: 246,591

[22] Filed: May 20, 1994

[30] Foreign Application Priority Data

Jun. 3, 1993 [JP] Japan .................................. 5-133606

[51] Int. Cl.$^6$ .................................................. G03D 13/08
[52] U.S. Cl. ........................................................ 242/348.4
[58] Field of Search ............................... 242/348, 348.4, 242/588.5; 354/310, 313, 319

[56] References Cited

U.S. PATENT DOCUMENTS

| | | |
|---|---|---|
| 3,568,587 | 3/1971 | Laval . |
| 4,834,306 | 5/1989 | Robertson . |
| 4,949,114 | 8/1990 | Combet et al. ........................ 354/313 |
| 5,311,237 | 5/1994 | Kawada et al. ........................ 354/341 |
| 5,357,303 | 10/1994 | Wirt ...................................... 242/348.4 |

OTHER PUBLICATIONS

Abstracts of Japan, vol. 12, No. 175 (P–707) (3022) 25 May 1988 & JP–A–62 286 051 (Fuji Photo Film) 11 Dec. 1987 *abstract*.

Primary Examiner—John P. Darling
Attorney, Agent, or Firm—Townsend and Townsend and Crew

[57] ABSTRACT

A light shielding magazine includes a pair of holders pivotable relative to each other for receiving a film cartridge. The film cartridge includes a film feed opening and a pivotable light shield provided for the film feed opening to prevent entry of ambient light and to allow passage of a film through the film feed opening. One of the holders defines a cover portion for covering the film feed opening when the light shielding magazine is mounted on the film cartridge, to prevent entry of ambient light to the film feed opening and to allow passage of the film fed out through the film feed opening.

8 Claims, 4 Drawing Sheets

LIGHT SHIELDING MAGAZINE FOR A FILM CARTRIDGE

BACKGROUND OF THE INVENTION

1. Field of the Invention

The present invention relates to light shielding magazines for film cartridges, and more particularly to a light shielding magazine for a film cartridge having a light shield movable between a closed position and an open position. The light shield, in the closed position, prevents entry of ambient light through a film feed opening and, in the open position, allows passage of a film through the film feed opening.

2. Description of the Related Art

A well-known holder of photographic film has a film rolled on a spool and enclosed in a cover. The cover defines a film feed opening light-shielded with patches of velvet or the like, through which the film may be drawn out.

This type of film holder is loaded into a camera, with the leader of the film drawn out through the film feed opening, for use in photo-taking with the camera.

As distinct from the film holder having the above construction, a novel film cartridge has been conceived. As shown in FIGS. 8 and 9, this film cartridge 50 may be loaded into a camera, with a film 52 including its leader completely contained in the cartridge 50. Thus, an operation to load the film cartridge 50 into the camera may be effected free of error.

With this novel film cartridge 50, film 52 may be fed out through the film feed opening 51 simply by rotating a spool 54 of the film cartridge 50.

Moreover, this film cartridge 50 includes, instead of velvet or the like, a light shield 53 for preventing entry of ambient light into the film cartridge 50. The light shield 53 is mounted in the film cartridge 50 to be pivotable about a pivotal axis 50a in directions indicated by arrows H to open and close a path of the film 52.

Where velvet or the like is used surfaces of the film 52 could have scratches or other flaws due to dust or the like adhering to the film surfaces and patches of velvet or the like after passing through the film feed opening 51 a plurality of times. Such inconvenience may be avoided with the novel construction. The film 52, after being developed, may be returned as contained in the film cartridge 50 to the customer.

When the above film cartridge 50 is loaded into a film developing device to have the film developed, the leader of the film 52 must be drawn out of the film cartridge 50 in advance. To drawn the film 52 out of the film cartridge 50, the light shield 53 must be opened. Then, ambient light could enter the film cartridge 50 through a gap provided by the light shield 53 in the open position.

To avoid entry of ambient light, it has been conventional practice to draw the leader of the film 52 out of the film cartridge 50 in a darkroom. Drawing the leader of the film 52 out of the film cartridge 50 in a darkroom is a troublesome operation.

SUMMARY OF THE INVENTION

The present invention has been made having regard to the state of the art noted above, and its object is to enable an operation in light conditions to draw the leader of a film out of a film cartridge having an openable and closable light shield for preventing entry of ambient light.

The above object is fulfilled, according to the present invention, by a light shielding magazine comprising a loading section for removably mounting on a film cartridge, and a cover portion for covering the film feed opening when the loading section is mounted on the film cartridge, to prevent entry of ambient light to the film feed opening and to allow passage of the film fed out through the film feed opening.

According to this construction, when, for example, the leader of a photographed film is fed out of the film cartridge to develop the film in a film developing device, the light shielding magazine is mounted on the film cartridge by means of the loading section, and the light shield in the film cartridge is opened. As a result, the film in the film cartridge becomes movable through the film feed opening.

In this state, ambient light could enter through the film feed opening. However, the cover portion of the light shielding magazine covering the film feed opening prevents entry of ambient light through the film feed opening. Thus, the film in the film cartridge is never exposed to incoming ambient light.

The film fed from the film feed opening of the film cartridge is drawn out through the cover portion of the light shielding magazine. The cover portion prevents ambient light from entering through the film feed opening even when the film is passing through the cover portion.

Thus, an operation may be carried out in light conditions to draw the leader of the film out of the film cartridge having the openable and closable light shield for preventing entry of ambient light.

The loading section may include a pair of holding pieces for fitting on the film cartridge and elastically deformable to spread and close for enabling attachment and detachment of the light shielding magazine.

When mounting the light shielding magazine on the film cartridge, the holding pieces are elastically deformed apart from each other, and then allowed to close on the film cartridge. The light shielding magazine mounted on the film cartridge holds the film cartridge reliably with the elastic holding pieces.

When separating the light shielding magazine from the film cartridge, the holding pieces are again elastically deformed apart from each other.

Thus, the simple construction comprising the pair of holding pieces elastically deformable to spread and close enables the light shielding magazine to mount on the film cartridge.

The loading section may include a pair of holders for fitting on the film cartridge and pivotable relative to each other for enabling attachment and detachment of the light shielding magazine.

With this construction, when the light shielding magazine is mounted on the film cartridge, the pair of holders are closed to fit on the film cartridge.

The holders of the light shielding magazine are opened when separating the light shielding magazine and film cartridge.

Thus, the light shielding magazine may be attached to and detached from the film cartridge by opening the pair of pivotable holders. This facilitates the operation to mount the light shielding magazine on the film cartridge.

The light shielding magazine may further comprise an opening and closing control device for opening and closing the light shield, and an opening stopper device for maintaining the pair of holders closed when the opening and closing control device is in an opening position.

With this construction, the opening stopper device prevents opening of the pair of holders when the opening and closing control device is in the opening position to open the light shield in the film cartridge. This prevents the film cartridge with the light shield opened from being exposed to ambient light, and protects the film from ambient light entering the film cartridge.

This construction avoids inadvertent opening of the holders when the light shield in the film cartridge is opened, which contributes toward facility of handling the light shielding magazine.

The light shielding magazine may further comprise a rotation control device for rotating a spool of the film cartridge, and a rotation stopper device for preventing operation of the rotation control device when the opening and closing control device is in a closing position.

With this construction, the rotation stopper device prevents operation of the rotation control device of the light shielding magazine when the opening and closing control device is in the closing position to close the light shield in the film cartridge. In this condition, the spool of the film cartridge is locked against rotation to protect the film rolled on the spool from damage by contact with the light shield.

This construction eliminates the chance of the spool of the film cartridge being rotated inadvertently when the light shield in the film cartridge is closed. The film is thereby protected from damage by contact with the light shield. This feature further promotes the light shielding magazine handling facility.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

A light shielding magazine according to the present invention will be described with reference to the drawings.

Figure 1:
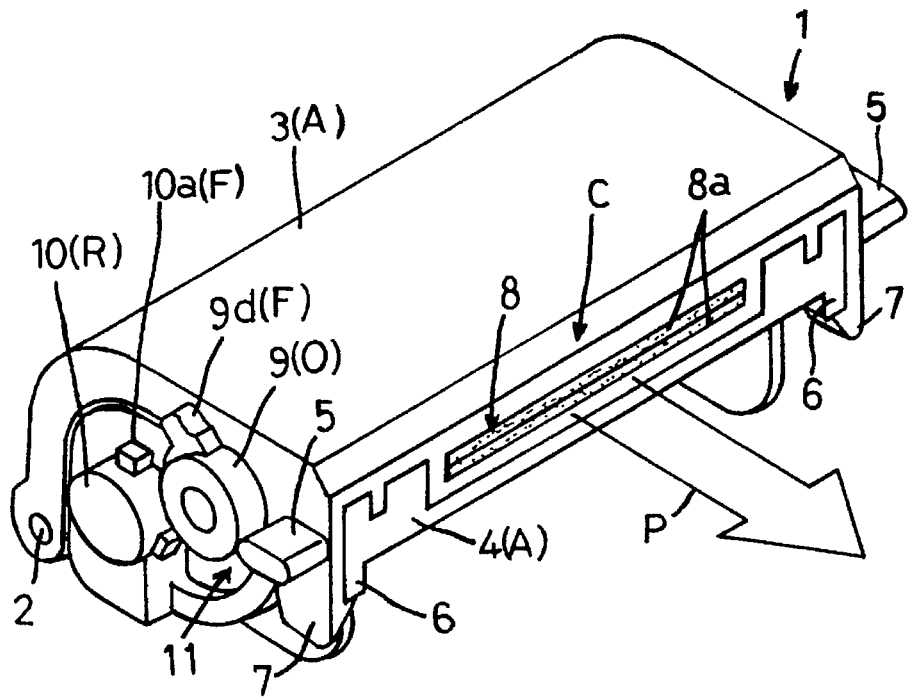
FIG. 1 is a perspective view of a light shielding magazine according to the present invention.

As shown in FIG. 1, a light shielding magazine 1 in this embodiment includes a pair of holders 3 and 4, i.e. an upper holder 3 and a lower holder 4 connected to be pivotable relative to each other about a pivotal axis 2. The pair of holders 3 and 4 are openable and closable through pivotal movement about the pivotal axis 2, and constitute a loading section A for removably mounting the light shielding magazine 1 on a film cartridge 50.

Figure 2:
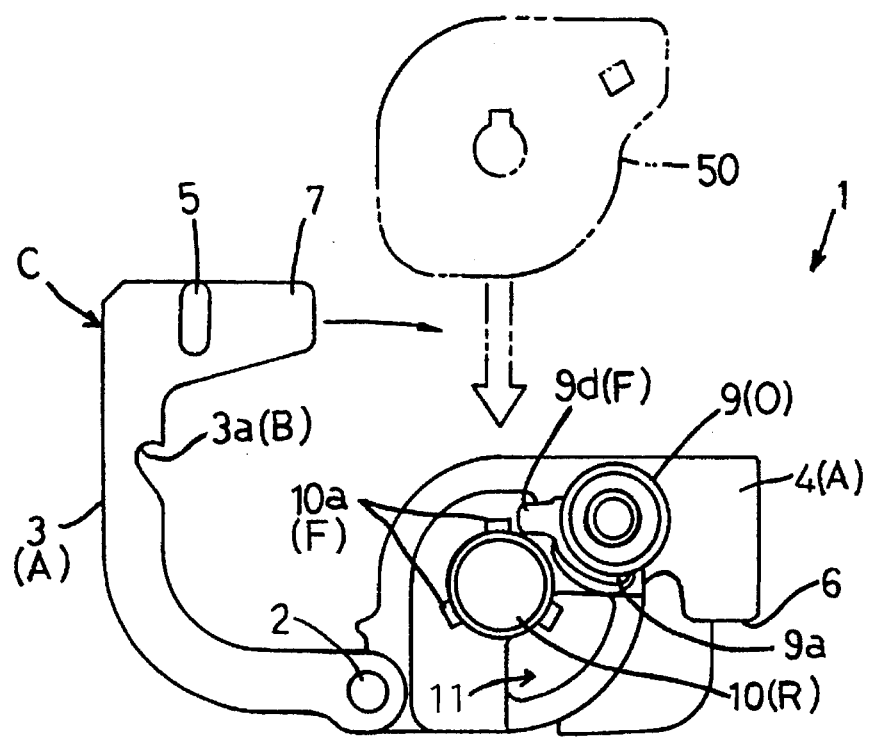
FIG. 2 is an explanatory view showing an operation to mount the light shielding magazine on a film cartridge.
Figure 3:
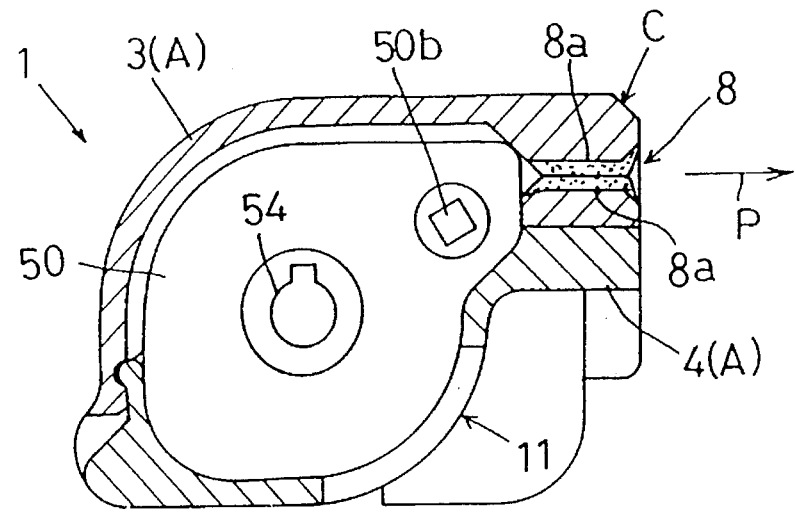
FIG. 3 is a sectional view of the light shielding magazine mounted on the film cartridge with a pair of holders closed.

As shown in FIG. 2, light shielding magazine 1 is mounted on the film cartridge 50 with the pair of holders 3 and 4 opened. After the film cartridge 50 is placed in the lower holder 4, the upper holder 3 is fitted to the lower holder 4. When closed, the pair of holders 3 and 4 surround the film cartridge 50 as shown in FIG. 3.

Various components of this embodiment will be described hereinafter.

The upper holder 3 includes a cover portion C disposed in a longitudinally middle position of a free end region thereof. The cover portion C contacts a film feed opening 51 of the film cartridge 50 when the light shielding magazine 1 is mounted on the film cartridge 50. The upper holder 3 further includes, arranged at opposite sides of a film drawing path P, a pair of opening and closing tabs 5, and engaging portions 7 having an increased wall thickness toward lower ends thereof for engaging engageable portions 6 of the lower holder 4.

The cover portion C defines an opening 8 for allowing passage of a film 52 drawn out through the film feed opening 51 of the film cartridge 50. As shown in FIG. 3, velvet patches 8a are applied to upper and lower surfaces of the opening 8 to act as a light shielding device.

For opening the upper holder 3 and lower holder 4, the user pulls up the pair of opening and closing tabs 5 while pressing an approximately middle position between the tabs 5. Then, the free end region of the upper holder 3 is depressed in a downwardly curved shape to separate the engaging portions 7 and engageable portions 6, thereby facilitating opening of the two holders 3 and 4.

The lower holder 4 includes an opening and closing control device O for opening and closing a light shield 53 in the film cartridge 50, an opening stopper device B for maintaining the pair of holders 3 and 4 closed when the opening and closing control device O is in an opening position, a rotation control device R for rotating a spool 54 of the film cartridge 50, and a rotation stopper device F for preventing operation of the rotation control device R when the opening and closing control device O is in a closing position.

The opening and closing control device O is in the form of a light shield control knob 9. The film cartridge 50 includes a light shield control member 50b formed integral with a pivotal axis 50a of the light shield 53 and projecting from the film cartridge 50 in the form of a square column. The light shield control knob 9 fits on the light shield control member 50b to be rotatable coaxially with the pivotal axis 50a.

Figure 4:
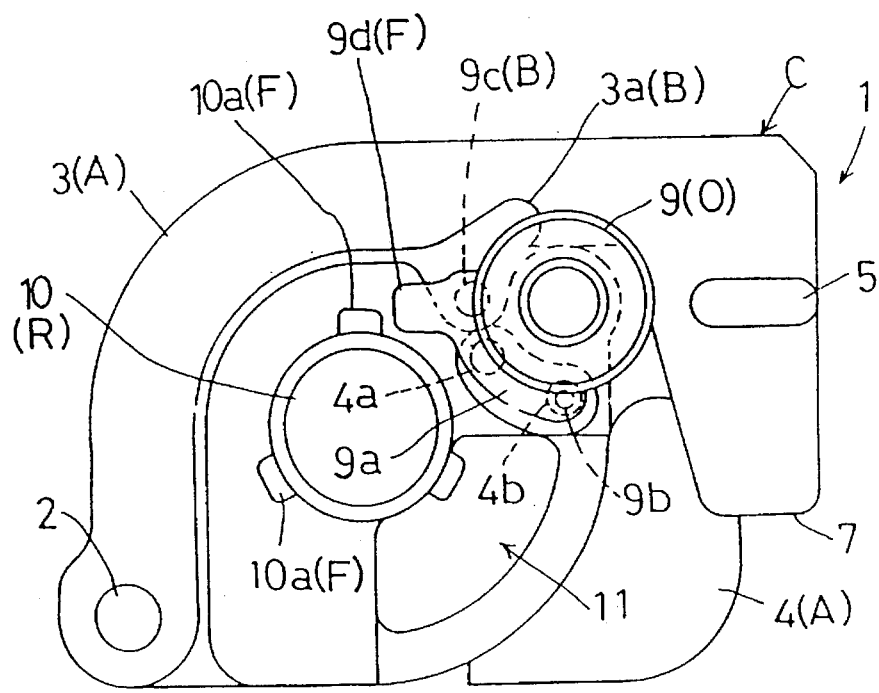
FIG. 4 is an explanatory view of the light shielding magazine in a position to close a light shield in the film cartridge.
Figure 5:
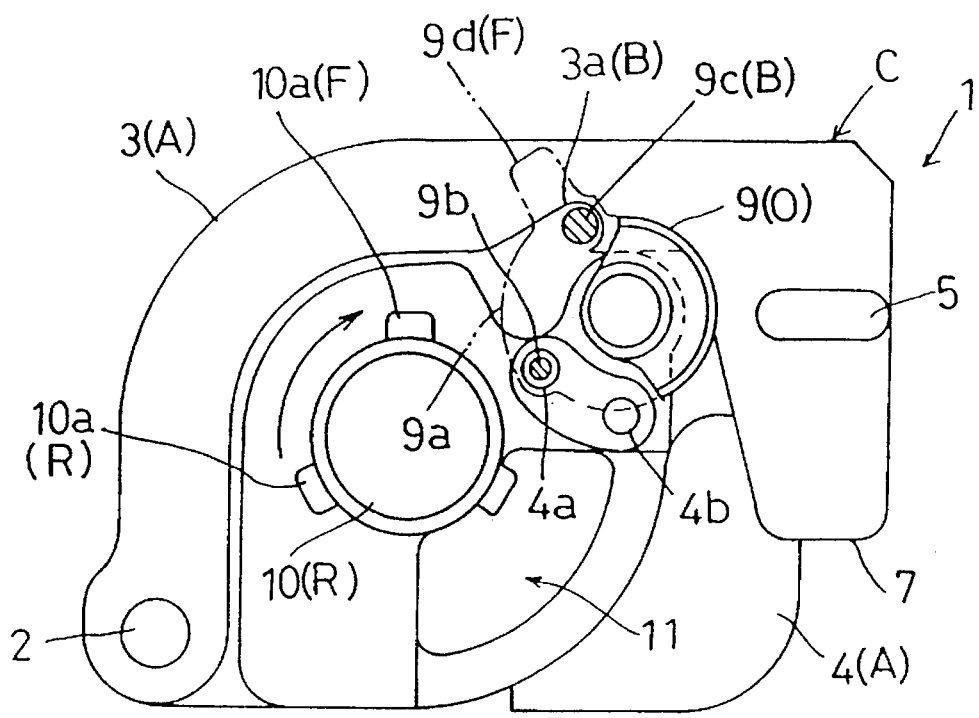
FIG. 5 is an explanatory view of the light shielding magazine in a position to open the light shield.

The light shield control knob 9 includes an edge 9a projecting radially from a proximal portion thereof. As shown in FIGS. 4 and 5, the edge 9a has a hemispherical projection 9b formed on a surface, opposed to the lower holder 4, of the edge 9a adjacent one end thereof in the counterclockwise direction in FIG. 4 (the terms "clockwise" and "counterclockwise" used in the following description refer to FIGS. 4 and 5).

Figure 9:
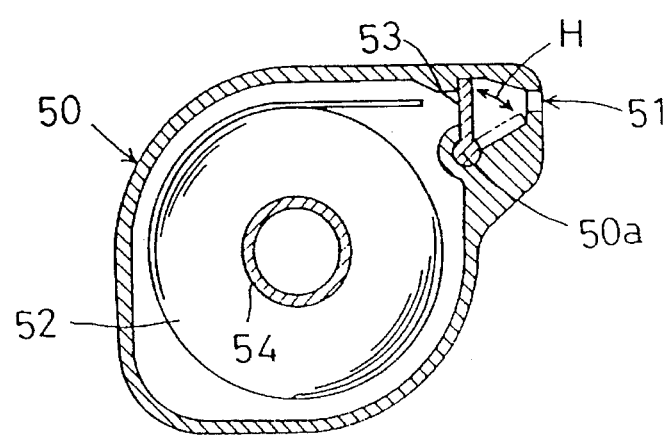
FIG. 9 is a sectional view of the film cartridge shown in FIG. 8.

The hemispherical projection 9b is selectively engageable with two hemispherical recesses 4a and 4b formed in the lower holder 4 and arranged along a circumference about the rotational axis of the light shield control knob 9. In FIG. 4, the hemispherical projection 9b is engaged with the hemispherical recess 4b to the counterclockwise side. This is a position for closing the light shield 53 in the film cartridge 50. In FIG. 5, the hemispherical projection 9b is engaged with the hemispherical recess 4a to the clockwise side. This is a position for opening the light shield 53 in the film cartridge 50. The light shield 53 is biased by a spring, not shown, to the closed position as shown in FIG. 9. The light shield 53 is pressed to the closed position which is determined by the hemispherical projection 9b and hemispherical recess 4b.

As shown in FIGS. 4 and 5, the opening stopper device B includes a cylindrical projection 9c formed on a surface, opposed to the lower holder 4, of the edge 9a of the light shield control knob 9 adjacent the end thereof in the clockwise direction, and a cutout 3a formed in the upper holder 3. The cutout 3a lies adjacent the light shield control knob 9 when the pair of holders 3 and 4 are closed.

As shown in FIG. 5, the cylindrical projection 9c of the light shield control knob 9 engages the cutout 3a of the upper holder 3 when the light shield 53 in the film cartridge 50 is opened. Thus, the opening stopper device B maintains the pair of holders 3 and 4 closed in this condition, thereby preventing the film 52 in the film cartridge 50 from being exposed inadvertently.

The rotation control device R is in the form of a spool knob 10 for engaging the spool 54 of the film cartridge 50 to be rotatable coaxially with the spool 54.

The rotation stopper device F includes rotation stopper projections 10a formed on a proximal portion of the spool knob 10 and arranged at intervals of 120 degrees circumferentially thereof, and an extension 9d extending radially from the clockwise end of the edge 9a of the light shield control knob 9.

With this rotation stopper device F, as shown in FIG. 4, one of the rotation stopper projections 10a of the spool knob 10 is movable into contact with the extension 9d of the light shield control knob 9 when the light shield 53 of the film cartridge 50 is closed and the spool knob 10 is rotated clockwise. This contact stops rotation of the spool knob 10, thereby protecting the leader of the film 52 from damage by its contact with the light shield 53.

As shown in FIG. 1 and other figures, the lower holder 4 includes a reading window 11 for reading information such as a bar code recorded on an outer surface of the film cartridge 50. The film cartridge 50 in the light shielding magazine 1 is pressed against inner walls of the pair of holders 3 and 4 around the reading window 11, to shut off ambient light entering through the reading window 11.

Description will be made briefly hereinafter of a process of mounting the above light shielding magazine 1 on the film cartridge 50 and feeding the leader of the film 52 out of the film cartridge 50.

First, as shown in FIG. 2, the pair of holders 3 and 4 are opened, the film cartridge 50 is placed in the lower holder 4, and the holders 3 and 4 are closed. At this time, the engaging portions 7 of the upper holder 3 engage the engageable portions 6 of the lower holder 4 to maintains the holders 3 and 4 closed reliably.

Next, as shown in FIG. 5, the light shield control knob 9 is turned clockwise. Then the hemispherical projection 9b engages the hemispherical recess 4a to the clockwise side to set and maintain the light shield 53 of the film cartridge 50 in the open position.

At the same time, the opening stopper device B prevents the holders 3 and 4 from being opened inadvertently.

When, in this state, the spool knob 10 is turned clockwise, the film 52 is fed out of the film cartridge 50 through the film feed opening 51 and the opening 8 of the cover portion C.

During passage of the film 52 through the opening 8 of the light shielding magazine 1, the velvet patches 8a applied to the opening 8 positively prevent entry of ambient light.

Other embodiments will be described below.

Figure 6:
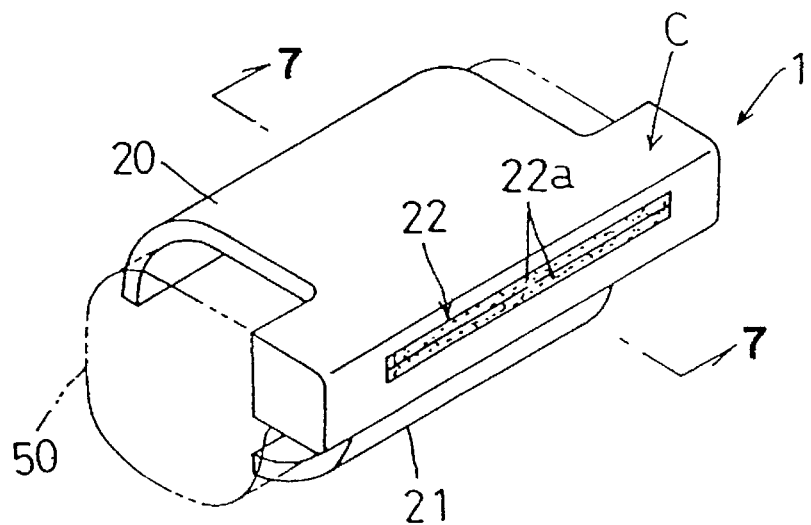
FIG. 6 is a perspective view of a light shielding magazine in a different embodiment of the invention.
Figure 7:
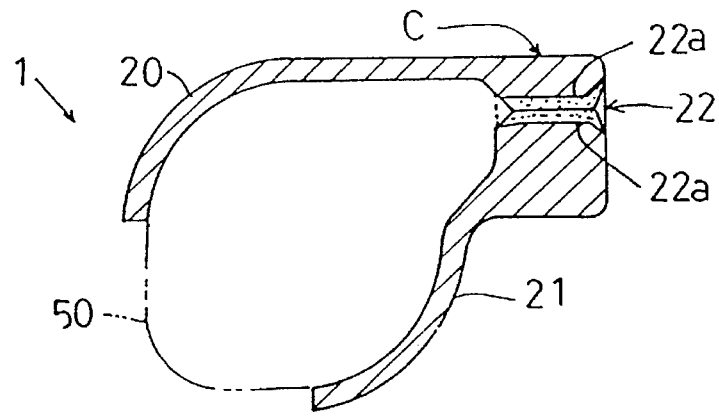
FIG. 7 is a section taken on line 7—7 of FIG. 6.
Figure 8:
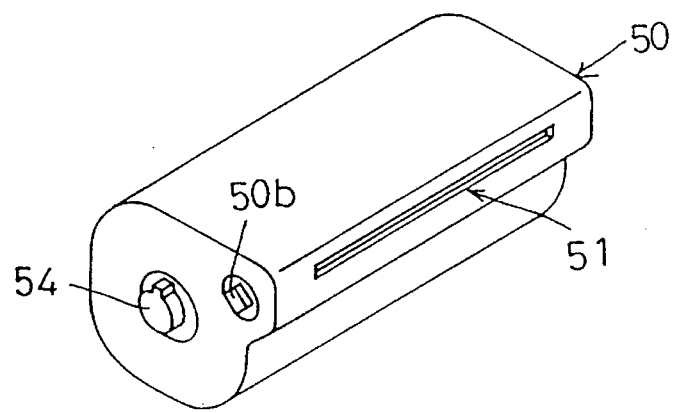
FIG. 8 is a perspective view of the film cartridge for which the light shielding magazine according to the present invention may be used.

(1) In the foregoing embodiment, the pair of holders 3 and 4 constitute the loading section A. The holders 3 and 4 may be replaced with a pair of holding pieces 20 and 21 as shown in FIG. 6 and FIG. 7, the latter being a sectional view taken on line Q—Q of FIG. 6. The light shielding magazine 1 having these holding pieces 20 and 21 is formed integrally, the holding pieces 20 and 21 being in the form of elastic plates.

This light shielding magazine 1 also includes a cover portion C defines an opening 22 for allowing passage of the film 52. As in the foregoing embodiment, velvet patches 22a are applied to upper and lower surfaces of the opening 22 to shut off ambient light.

When mounting this light shielding magazine 1 on the film cartridge 50, the holding pieces 20 and 21 are elastically deformed apart from each other, and the cover portion C of the light shielding magazine 1 is fitted around the film feed opening 51 of the film cartridge 50. When separating the light shielding magazine 1 from the film cartridge 50, the holding pieces 20 and 21 are elastically deformed apart from each other to pull out the film cartridge 50.

(2) In the foregoing embodiment, the opening stopper device B has the cylindrical projection 9c of the light shield control knob 9 engaging the cutout 3a of the upper holder 3 to prevent opening of the holders 3 and 4. The cylindrical projection 9c may be replaced with a press fitting element formed of rubber or the like and provided in the same position as the cylindrical projection 9c. In this case, the press fitting element engages the upper holder 3 when the light shield 53 in the film cartridge 50 is opened, to maintain the holders 3 and 4 closed.

(3) In the foregoing embodiment, the rotation stopper device F has the extension 9d of the light shield control knob 9 contacting one of the rotation stopper projections 10a of the spool knob 10 to prevent rotation of the spool knob 10. The light shield control knob 9 may include a press fitting element formed of rubber or the like and slightly displaced counterclockwise from the extension 9d. In this case, the press fitting element engages the spool knob 10 when the light shield 53 in the film cartridge 50 is closed, to prevent rotation of the spool knob 10.

What is claimed is:

1. A light shielding magazine comprising:

a loading section for removably mounting on a film cartridge including a film feed opening and an openable and closable light shield, said light shield, when in a closed position, preventing entry of ambient light through said film feed opening and, when in an open position, allowing passage of a film through said film feed opening;

said loading section including a pair of holding pieces for fitting on said film cartridge and elastically deformable for enabling attachment and detachment of said light shielding magazine; and a cover portion for covering said film feed opening when said loading section is mounted on said film cartridge, to prevent entry of ambient light to said film feed opening and to allow passage of said film fed out through said film feed opening.

2. A light shielding magazine as defined in claim 1, wherein said holding pieces are formed integral with each other.

3. A light shielding magazine as defined in claim 2, wherein said cover portion includes light shielding means. shielding magazine.

4. A light shielding magazine comprising:

a loading section for removably mounting on a film cartridge including a film feed opening and an openable and closable light shield, said light shield, when in a closed position, preventing entry of ambient light through said film feed opening and, when in an open position, allowing passage of film through said film feed opening;

said loading section including a pair of holders for fitting on said film cartridge and pivotable relative to each other for enabling attachment and detachment of said light shielding magazine;

opening and closing control means for opening and closing said light shield, and opening stopper means for maintaining said pair of holders closed when said opening and closing control means is in an opening position; and a cover portion for covering said film feed opening when said loading section is mounted on said film cartridge, to prevent entry of ambient light to said film feed opening and to allow passage of said film fed out through said film feed opening.

5. A light shielding magazine as defined in claim 4, further comprising rotation control means for rotating a spool of said film cartridge, and rotation stopper means for preventing operation of said rotation control means when said opening and closing control means is in a closing position.

6. A light shielding magazine as defined in claim 5, wherein said cover portion includes light shielding means.

7. A light shielding magazine as defined in claim 5, wherein said rotation control means includes a spool knob for engaging said spool to be rotatable coaxially with said spool, and said rotation stopper means includes rotation stopper projections formed on a proximal portion of said spool knob and arranged at predetermined intervals circumferentially thereof, and an extension extending radially from an edge of said light shield control knob.

8. A light shielding magazine as defined in claim 6, wherein said opening and closing control means includes a light shield control knob for fitting on a light shield control member formed integral with a pivotal axis of said light shield and projecting from said film cartridge, said light shield control knob being rotatable coaxially with said pivotal axis, and said opening stopper means includes a projection formed on a surface opposed to one of said holders, and a cutout formed in the other holder and lying adjacent said light shield control knob when said pair of holders are closed.

* * * * *